June 7, 1932.	S. E. SIINO	1,862,201

MARKING GAUGE

Filed June 25, 1930

INVENTOR.
Salvador E. Siino
BY M. C. Frank
ATTORNEY.

Patented June 7, 1932

1,862,201

UNITED STATES PATENT OFFICE

SALVADOR E. SIINO, OF PITTSBURG, CALIFORNIA

MARKING GAUGE

Application filed June 25, 1930. Serial No. 463,651.

The invention relates to a gauge particularly designed for use by carpenters and cabinet makers for marking a member for cutting to abut against a previously placed member of a structure.

An object of the invention is to provide a gauge of the class described which, while mounted on the member to be marked and cut, is arranged for positioning for marking by the direct use of the surface which it is to abut when cut in accord with the mark.

Another object of the invention is to provide for operably mounting the gauge on members of different thickness.

A further object is to provide a generally improved and simplified gauge of the character described.

The invention possesses other objects and features of advantage, some of which, with the foregoing will be set forth or be apparent in the following description of a preferred embodiment of the invention which is illustrated in the accompanying drawing, in which.

Figure 1:
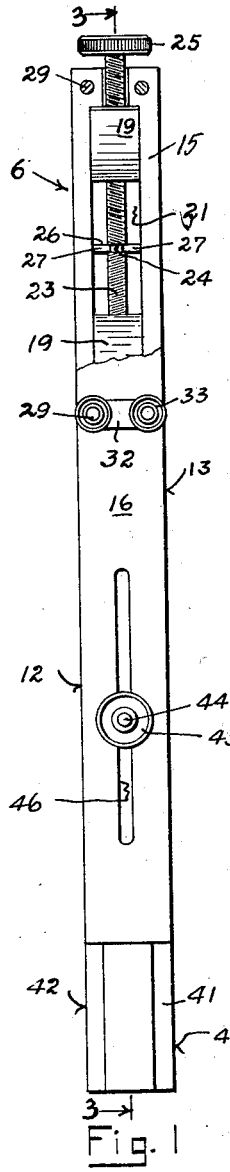
Figure 1 is a longitudinal face view of the gauge, a portion of a front member thereof being broken out to disclose interior structural features of the gauge.

In cutting a baseboard or the like to abut against the edge of a door or window casing, it is a usual custom to mark the board only for length and then cut it off square. Such a procedure is satisfactory, provided the casing is plumb; but casings are frequently out of plumb, hence the ends of boards which have been cut off square must thereafter be planed or otherwise trimmed to complete a proper fitting thereof in their intended places. The above specific example of a fitting problem frequently met by carpenters in installing finish is typical of a large number of situations which must be met by carpenters and cabinet makers, and it is the provision of a device by which the desired fit may be provided and assured by the one cutting operation which the present invention particularly concerns. For purposes of illustration, a gauge 6 embodying the invention is specifically shown in Figures 3 and 5 as applied to a section of baseboard 7 which is to be fitted between a door casing 8 and a corner 9, and at and above the top surface 11 of a floor.

Essentially, the gauge 6 of my invention comprises an elongated body of uniform rectangular cross-sectional outline having extending therethrough at one end and between opposite edge faces 12 and 13 of the body a slot 14 for the reception of a board which is to be marked, the gauge body being understood to be arranged to straddle a board on which it is mounted. Since boards vary in thickness, the gauge body is preferably divided longitudinally to provide transversely and adjustably separable members 15 and 16 whereby to permit its straddling mounting on boards of different thickness, it being generally desirable, on account of the limited space between the board and wall that the slot width does not too greatly exceed the board thickness. The faces 12 and 13, it is noted, are mutually parallel, and the parts of each said face provided on the different members 15 and 16 are mutually coplanar.

Figure 5:
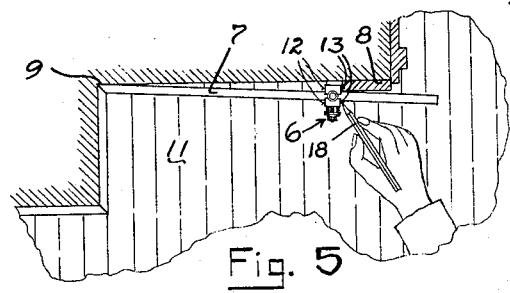
Figure 5 is a minified plan view showing the gauge in fully operative position on a board being marked.

Referring to the showing of Figure 5, the device now described as to its structural essentials is seen to be there disclosed as in fully operative position on the base board section 7. Said board has been placed with the previously cut end thereof engaged in the corner 9 and with its other end portion lying against and outwardly of the casing 8, the bottom edge of the board being engaged on the floor surface 11 whereby the longitudinal board axis is at its required level. The gauge 6 has been mounted on the board 7 adjacent and generally laterally of the casing whereby a portion thereof lies in the space between the wall and board, and the portion of its face 13 provided on the member 15 is in engagement with and along the opposing casing edge which the board is to be cut to fit. In this manner, since the portion of the gauge face 13 provided on the member 16 is coplanar with the portion thereof on the member 15, the former may be used as a guide for a marking pencil 18 or the like for defining on the outer board face a mark to guide the required cut. Such a mark, it is clear, is in accordance with the casing edge to be fitted without regard to the actual disposal of the same with respect to the vertical, so that cutting off the board in accordance with the mark produces the required fit immediately and without requiring further fitting operations at the jointure of the board and casing. The present device is therefore seen to be particularly valuable for saving time and labor where a close fitting of one board member to another already placed is desired. It will be obvious that the gauge face 12 would be used in a similar manner for a left-side mark.

Referring now to the disclosed means for adjusting the width of the slot 14 which is to receive a board, said means includes a pair of wedges 19 engaged with and between the members 15 and 16 for movement longitudinally thereof whereby to maintain the mutual parallelism of the members. The slot 14 is provided in the board-engaging portion of the gauge by notching out opposed portions of the members 15 and 16 and the wedges 19 are mounted in opposed and generally rectangular depressions or pockets 21 provided in the other portions of said members. As particularly shown, the pockets 21 are formed to provide oppositely inclined bottom portions 22 for complementary engagement with the wedges 19, the two wedges being accordingly oppositely directed. An adjusting screw 23 threadedly engages the wedges 19, said screw having an intermediate annular groove 24 and the screw threads being of opposite pitch at the different sides of said groove; in this manner, a rotation of the screw 23 is understood to cause the wedges to mutually approach or separate in accordance with the direction of rotation of the screw 23. Preferably, and as shown, the screw 23 extends from the gauge end thereat and is provided with a knurled head 25 for manipulating the same, the sections 15 and 16 being semi-cylindrically recessed opposite the screw whereby the screw is arranged to always be clear thereof. The screw 23 may be secured against axial shifting in any suitable manner; as particularly shown in Figures 1 and 3, an integral boss 26 is extended transversely of and from the member 15 and through and from the pocket 21 thereof, said boss being provided with a pair of spaced terminal ears 27 arranged to span the screw 23 and engage in the groove 24 of the screw.

Figure 2:
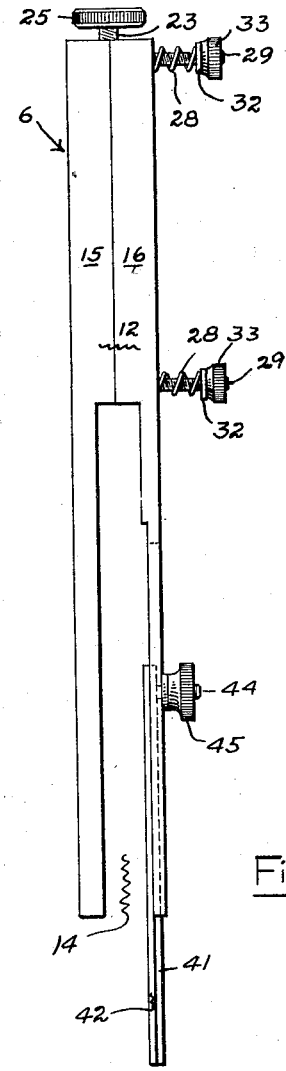
Figure 2 is a side edge view of the gauge.
Figure 3:
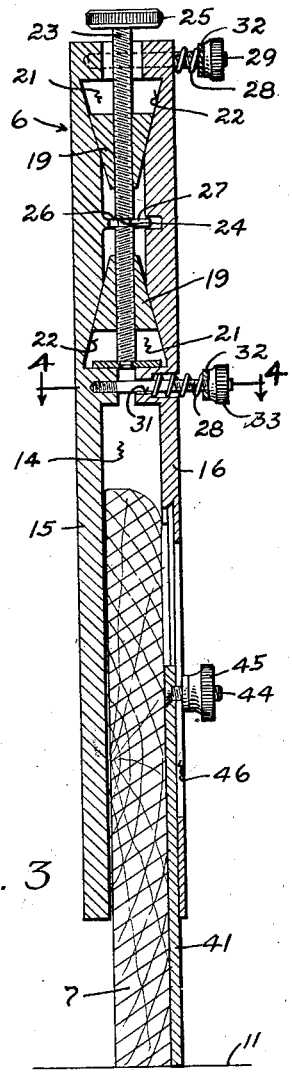
Figure 3 is a longitudinal sectional view taken at the line 3—3 in Figure 1, and showing the gauge expanded and operably mounted on a board to be marked.
Figure 4:
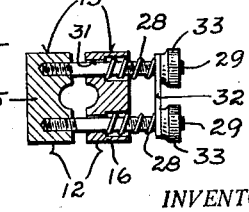
Figure 4 is a section at 4—4 in Figure 3, the gauge being expanded as in Figure 3.

Means are provided whereby the gauge members 15 and 16 are yieldingly urged toward each other at all times so that they may be held in their contacting relation shown in Figure 2, or held against the wedges as shown in Figure 3. In the present instance, the aforesaid means comprise helical compression springs 28 which are cooperative between the members in the desired manner. For mounting the springs 28 in operative relation to the sections, pins 29 are fixed in the inner gauge member 15 to extend transversely therefrom and slidably engage in guide perforations 31 provided in the outer member 16, said pins and perforations being directed perpendicularly of the slot 14 whereby the members 15 and 16 are constrained to a solely transverse relative adjustment thereof. Two pairs of the pins 29 are provided, the different pairs each defining a plane transverse to the longitudinal gauge axis and disposed adjacent and slightly beyond the opposite ends of the pockets 21; this arrangement is seen to permit the present disposal of the wedge-adjusting screw 23 in the longitudinal axial line of the gauge, besides limiting the relative movement of the members as desired.

The springs 28 are mounted on outwardly extending portions of the pins 29 and are compressedly engaged between the member 16 and plate members 32 mounted on and between the extending ends of each pair of pins 29. The plates 32 are perforated to freely receive the pin ends therethrough and thumb-nuts 33 are threadedly mounted on said pin ends outwardly of the plates whereby the plates are adjustable along the pins and the effective spring pressure to urge the members 15 and 16 toward each other may be variably adjusted. In this manner, the wedges 19 are arranged to constantly operate against the resistance of the springs 28, and the members 15 and 16 are arranged to be held set in adjusted relation for providing a slot 14 of required width.

For use of the device with boards which are wider than the length of the slot 14, an adjustable extension arm 41 is provided for the outer gauge member 16, said extension being slidably countersunk in the inner side of said member opposite the slot 14 for a solely longitudinal movement along and from the member. The side edge faces 42 and 43 of the arm 41 provide ruler edges to respectively form continuations of the faces 12 and 13 of the member, and a bolt 44 carrying a thumb-nut 45 extends transversely outwardly from the arm 41 and through a slot 46 provided in the member 16 whereby the extension arm 41 may be fixed in adjusted position. The arm 41, it is noted, provides for the marking of relatively wide boards completely thereacross.

With the gauge structure now described, a board 7 need not tightly fit the slot 14, it being necessary only that the front member 16 engage flat against the front face of the board to insure a proper marking line. When the device is to be used repeatedly on boards of the same thickness, the slot would preferably be made of a size to freely receive the boards, thereby facilitating the use of the gauge.

From the foregoing description taken in connection with the accompanying drawing, the advantages of the construction and method of operation will be readily understood by those skilled in the art to which the invention appertains, and while I have thus described the principles of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. A marking gauge comprising a pair of members formed with opposed cam surfaces and connected to straddle a board and present a pair of like, parallel and co-planar edges, one on each side of the board, wedge means positioned between said members, means to move said wedge means against the cam surfaces formed on said members to separate the members, pins carried by one of said members and extending through holes in the other member to maintain them in a parallel position, and resilient means carried by said pins and urging the said members toward each other.

2. A marking gauge comprising a pair of members formed with opposed cam surfaces and connected to straddle a board and present a pair of like, parallel and co-planar edges, one on each side of the board, wedge means positioned between said members, means to move said wedge means against the cam surfaces formed on said members to separate the members, pins carried by one of said members on opposite sides of said wedge means and extending through holes in the other member to maintain them in a parallel position, and resilient means carried by said pins and urging the said members toward each other.

3. A marking gauge comprising a pair of members formed with opposed cam surfaces and connected to straddle a board and present a pair of like, parallel and co-planar edges, one on each side of the board, wedge means positioned between said members, means to move said wedge means against the cam surfaces formed on said members to separate the members, pins carried by one of said members and extending through holes in the other member to maintain them in a parallel position, resilient means carried by said pins and urging the said members toward each other and means for adjusting the tension on said resilent means.

4. A marking gauge comprising a pair of members formed with opposed cam surfaces and connected to straddle a board and present a pair of like, parallel and co-planar edges, one on each side of the board, wedge means positioned between said members, means to move said wedge means against the cam surfaces formed on said members to separate the members, pins carried by one of said members and extending through holes in the other member to maintain them in a parallel position and an extension device on the end of one of said members.

In testimony whereof, I affix my signature.
SALVADOR E. SIINO.